2,998,501
APPARATUS FOR MAKING FOAMED POLYMERIC STRUCTURAL MATERIALS
Edwin A. Edberg, Greene, N.Y., and Richard H. Immel, Sewickley, Pa., assignors to Koppers Company, Inc., a corporation of Delaware
Filed Dec. 27, 1957, Ser. No. 705,540
2 Claims. (Cl. 219—10.65)

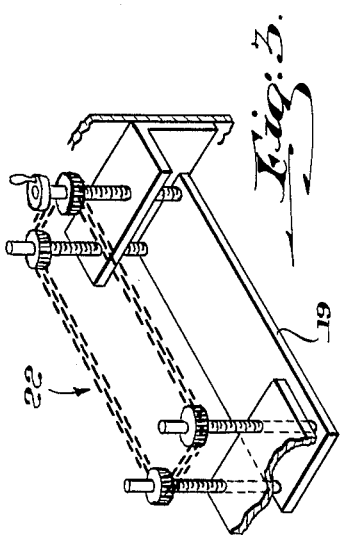
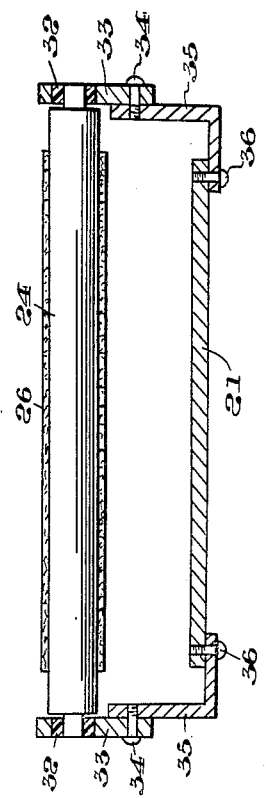
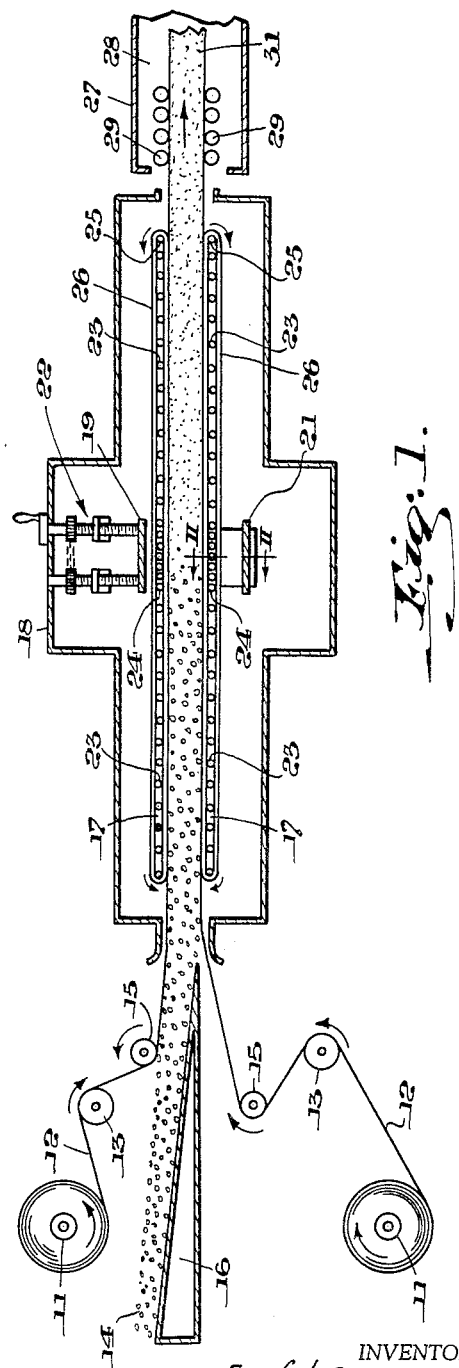
INVENTORS.
EDWIN A. EDBERG, and
RICHARD H. IMMEL.
BY J.E. Armstrong
their
ATTORNEY.

This invention relates generally to apparatus for making foamed polymeric materials and in one specific aspect, it relates to novel apparatus for producing an item comprising cellular polymeric material interposed between and affixed to a facing material.

The art of making integral low density cellular polymeric structures having uniform small voids from expandable polymeric materials is well established. A particularly useful process for making the starting expandable polymeric materials is described in the copending application of Gaetano F. D'Alelio, Serial No. 394,230 filed November 24, 1953 now Patent 2,983,692. Expandable polymeric materials that can be conveniently made by the D'Alelio process include polystyrene, polyethylene, polypropylene, alkyl-substituted styrenes, polyacrylic esters and polymethacrylic esters; copolymers of styrene and alphamethyl styrene, copolymers of styrene and alkyl-substituted styrenes, e.g. vinyl toluene, copolymers of styrene and small amounts of divinyl benzene and copolymers of butadiene or other dienes or acrylonitrile and styrene. The expandable materials have incorporated therein from 3 to 30 parts by weight of an aliphatic or cycloaliphatic hydrocarbon boiling in the range of 35 to 60° C. Suitable hydrocarbons include petroleum ether, pentane, hexane, heptane, cyclopentane, cyclohexane, cyclopentadiene, and mixtures thereof. The expandable particles are generically known as beads; they may be round, pillow-shaped or irregularly shaped due to comminution.

Various means have been suggested for heating the beads to cause them to expand into an integral cellular polymeric structure. Hot water has been used, but such treatment is limited in its commercial application to situations wherein the foamed material is molded, or where it is not prepared in situ with facing materials of various types. The hot water technique is also limited with respect to time; it sometimes takes several hours to produce the foamed polymeric materials.

Infrared rays have also been used. The tendency in this method is to overheat one side of the bead, thereby causing collapse of the foamed structure and unevenly increased density, the heated side having a high density and the unheated side having a low density. Difficulties are also encountered when an effort is made to form the foamed structure in situ using infrared heat.

The use of steam to promote expansion of the beads has likewise been suggested; however, there are some limitations of a steam process which have yet to be overcome. When the foam structure is formed in situ with facing materials, it is difficult to provide uniform heating of the expandable particles. Uneven heat transfer results in non-uniform expansion and poor fusion of the polymeric foam.

It has been proposed that high frequency waves be used to effect the expansion of polystyrene. Unfortunately, polystyrene and the related expandable polymeric materials approach in varying degrees the ideal dielectric. In other words, since they are virtually transparent to the power applied to them by high frequency waves, they cannot be heated to their melting point in a high frequency field.

The known methods of expanding the polymeric materials are found wanting when considered in connection with another aspect of the problem overcome by the present invention. Sandwich-type foam core panels are much in demand by the building industry. The packaging industry has been equally in need of a commercially practical method of making foam core paperboard. Heretofore, the board structures for the manufacture of shipping containers have been made of such materials as laminated kraft board and kraft liner board laminated to low grade jute, chip board filler stocks or corrugated board. The solid fiber board containers have been used with only limited success for the shipment of vegetables, meats and other perishable products that must be refrigerated in shipment because of the absorption of moisture by the solid fiber board. The moisture causes the paper to lose its compression strength. Thus, the boxes collapse in service rather than remain rigid to provide proper protection for the packaged contents. Similarly, the compression resistance of corrugated boxes is adversely affected by moisture. Polymer latices, e.g. polystyrene latex, have been co-precipitated with polystyrene in the pulp mass used for making sheets for corrugated boards. However, if sufficient polystyrene is incorporated into the sheets to prevent water absorption, the resulting board is so rigid that it can not be successfully scored for folding, obviously a necessary requirement in the preparation of containers.

We have provided a novel apparatus for continuously making sandwich-type structures having polymeric foam as a core. The present invention contemplates an improvement in apparatus for conveying material through a high frequency field to be treated therein, the improvement comprising electrodes movably mounted in spaced relationship to provide a high frequency field, upper and lower sets of parallel electrically insulated idling rolls having ends extending beyond the field and attached to movably mounted supports outside the field and positioned in the field in planes parallel with the electrodes, glass supports located beyond the field and slidably connected with the ends of the insulated idling rolls and angular supports extending beyond the field connecting the glass supports with the electrodes and on both sides of each set of idling rolls with the field in the same plane and parallel therewith, endless belts traveling over the idling rolls and driving means associated with the belts.

In accordance with the present invention we have found that high frequency waves may be used to transfer energy to expandable polymeric materials in such a manner that the electrical energy is immediately converted to thermal energy. The heat produced results in an almost instantaneous expansion of the polymeric material to produce an integral, cellular, low density structure having small and uniform voids.

We have indicated that previous attempts to make foam from expandable polymeric materials of the type contemplated by this invention using high frequency waves have failed because such materials do not readily accept high frequency energy. The ability of a material to undergo dielectric heating, or to accept high frequency energy, is perhaps best explained in terms of the following equation:

$$Pv\left(\frac{\text{watts}}{\text{in}^3}\right) = 1.41 \ E^2 \times f . \epsilon \ \tan \delta$$

wherein:

$Pv$ is the power absorbed per unit volume of material (the concentration of heat generated);

$f.$ is the frequency in megacycles per second;

$\epsilon$ is the dielectric constant of the material (the ratio of the capacitive current through the material to the capacitive current which would flow if the same field intensity was applied to free space);

E is the electrical force in kilovolts per inch; and $\delta$ is the phase difference between the electrical force E and the electric displacement which it produces. The value tan $\delta$ is called the power factor. The product of the dielectric constant $\epsilon$ and the power factor tan $\delta$ is called the power loss factor. Only materials possessing a high power loss factor undergo dielectric heating. The expandable polymeric materials (such as those of D'Alelio described aforesaid) contemplated by the present invention are characterized by a low power loss factor, perhaps because of the general symmetry of their molecular structure. For example, at a frequency of between 5 and 100 megacycles per second, these materials have a power loss factor ranging from about 0.04 to 3. On the other hand, resins such as vinyl chloride and vinyl acetate, which are inoperative for the purposes of the present invention because they tend to overheat in a high frequency field, have a power loss factor of greater than about 20 in this same frequency range.

We have discovered that the polymeric materials of the present invention may be rendered suitable for dielectric heating by treating or covering them with a high power loss factor material, e.g. one having a power loss factor of at least about that of water. Thus, when the treated materials are placed in a field of high frequency waves, the high loss factor material absorbs sufficient energy to heat by molecular friction. The thermal energy thereby produced is transferred to the expandable polymeric materials to cause the formation of an integral low density cellular product having uniform small voids.

Water is an excellent example of a high loss factor material. The use of water in combination with expandable polymeric material is quite effective when only a small volume of polymer is to be expanded and the polymeric layer in the high frequency field is relatively thin. However, the use of water alone sometimes fails to give the requisite uniform distribution of thermal energy throughout the polymeric material. This is especially true when a thick layer of expandable material is placed in a high frequency field. As the thickness of the layer of material in the field is increased, it becomes necessary to increase the space between the electrodes. If the frequency and power are held constant, this increase in space diminishes the strength of the high frequency field. Hence, a longer exposure time is required to attain the temperature necessary to cause softening of the polymer and formation of the polymeric foam. Unless the layer of polymeric material between the electrodes is very thin, it generally requires about 40–60 seconds to form polymeric foam using water alone as a high power loss factor treating material.

Obviously, the most efficient commercial process for making polymeric foam is one wherein a minimum heating time is required for expansion of the polymeric material. Time becomes especially critical when the foam is produced in the form of self-sealing continuous sheets or is disposed between facing materials, as in the manufacture of sandwich-type panels. Although a 40 second heating time represents a considerable improvement over most currently used commercial techniques, we have found that this time may be reduced to about 10 seconds or less using the preferred method of the present invention. In this method the water is combined with a minor portion of a wetting or coating agent that promotes uniform covering of the expandable polymeric material by the water molecules. The type of wetting agent useful herein is virtually unlimited. For example, suitable wetting agents include, but are not limited to, fatty acid tertiary amine salts, e.g. triethanol amine lauryl sulfate, alkyl aryl sulfonates, alkyl aryl polyether alcohols, polyglycol esters, dialkyl esters of sulfosuccinic acids, sulfated fatty acid esters, e.g. sulfonated isopropyl oleate, sulfonated fatty acid esters, fatty amides and polyamides, salts of sulfate esters of alkyl phenoxy polyoxyethylene alkanols, long chain hydrocarbon sodium sulfonates, fatty alkylol amide condensates, trialkyl amine oxides, quaternary ammonium salts, e.g. cetyl dimethyl benzyl ammonium chloride, alkyl polyoxyethylene glycol amides, sodium acyl alkyl taurates, monoalkyl biphenyl monosulfonate salts, dialkylphenyl phenol disulfonate salts, polyoxyethylene alkyl ethers and thioethers, organic polyphosphates, polymerized salts of alkyl naphthalene sulfonic acids, alkyl sulfate salts, fatty alcohol ethylene oxides, alkoxypolyglycol fatty acid esters, alkanolamine fatty acid condensates, polyoxyethylene alkyl phenols, alkyl phenoxy polyoxyethylene alcohols, mixtures of naphthenic and cresylic acids, fatty acid amide-ether derivatives, modified acyl imidazolene hydroxy esters, carboxylic acid-alkanolamine condensates, sulfated cresylic acid, long chain betaines, polyoxyethylene esters of mixed fatty and rosin acids, polyoxyethylene triacyl alkanols, alkylated alkylene polyamines, acyl sarcosines, acyl benzene sulfonates plus alkyl amide sulfates, bis(p-tert-alkyl phenoxyethyl) sulfosuccinate salts, phosphorated higher alcohols, sodium salts of acyl toluenes, and the like.

In addition to the water soluble or water dispersible wetting agents of the type hereinbefore enumerated, a solid coating material can be admixed with water to cause adherence of the water molecules to the surface of the expandable polymeric material. The solid material can be mixed with water in sufficient quantity to form a paste-like mass, which can then be applied to the polymeric material. This technique has special advantage in the preparation of self-extinguishing flame-retardant polymeric foam. In the copending application of John J. Killoran and Gaetano F. D'Alelio, Serial No. 410,761, now U.S. Patent No. 2,894,918, there is described a method of making flame-retardant expandable polymeric materials by admixing from 10 and 30 parts by weight chlorinated aliphatic hydrocarbon containing about 65% chlorine, from 2.5 to 20 parts by weight antimony oxide and from 70 to 87.5 parts by weight of expandable polymeric material. By a method of the present invention the requisite proportions of aliphatic hydrocarbon and antimony oxide can be admixed with a quantity of water to form a paste-like mass. This paste can then be applied to the surface of the expandable polymeric material. Thus, the aliphatic hydrocarbon and antimony oxide combination serves as a coating agent by which the uniform distribution of water molecules on the surface of the expandable material is accomplished. Thus treated, the expandable polymeric material is placed directly in a high frequency field to make the self-extinguishing flame-retardant foam. In preparing the paste, the aliphatic hydrocarbon-antimony oxide combination can comprise between 50–70% of the total weight thereof. About 8–10 seconds is sufficient heating time for preparing the flame-retardant foam in the above manner.

We have indicated that time is of paramount importance in the continuous preparation of polymeric foams and sandwich-type polymeric structural material. The heating time, or the time in which the expandable polymeric material is exposed to high frequency waves, depends upon the temperature required for foam formation and the rate at which that temperature is reached for a given material. To make the polymeric foam, the expandable material must be heated at least to a temperature range wherein softening of the polymer occurs. To avoid charring, the polymeric foam must be removed from the high frequency field before overheating occurs.

The upper and lower temperature limits will vary with the choice of polymeric material. For example, when expandable polystyrene is heated, a temperature of from about 100 to 125° C. must be attained to cause expansion and softening of the polymeric particles. Generally speaking, with regard to the upper limit, the polymeric foams should be removed from the high frequency field before a temperature of about 135–150° C. is reached.

The required temperature also varies with the density of the expandable polymeric material. For instance, when expandable polystyrene having a density of 2 lbs. per cubic foot is heated, a temperature of about 110° C. is sufficient to soften the polymer and promote expansion. If the density of the material is decreased to about 1 lb. per cubic foot, a temperature of about 120° C. is required.

For control purposes, the temperature may be physically measured during the dielectric heating step provided, however, that the thermometer is preheated and is placed in contact with the expandable polymeric material in a manner avoiding any interference with the high frequency field.

Using the apparatus of the present invention the temperature and the rate at which it is attained may be varied in many ways. Since the expandable polymeric materials having a low power loss factor do not heat in a high frequency field, the quantity of high power loss factor material applied to them will control the rate and the amount of the dielectric heating that occurs. In applying high loss factor material to the polymer as a treating solution comprising water and water-soluble wetting agent (or as a treating paste comprising water and water-insoluble adhesive-type solid), the weight ratio of treating solution (or paste) to polymer necessary to attain the desired temperature generally varies from about 1:1 to 1:25. If a ratio of treating solution to polymeric material greater than 1:1 is used, the polymeric material becomes too wet, and it is difficult to remove the moisture therefrom upon subsequent expansion. If the ratio is less than 1:25, it is difficult to obtain a substantially uniform covering of the polymeric material, and uneven heating in the high frequency field results.

When a water-soluble or water dispersible wetting agent is used, the wetting agent comprises about 0.05 to 20% by weight of the treating solution. The concentration of the wetting agent in the treating solution varies considerably with the power loss factor and other physical properties of the particular wetting agent employed. For example, an alkyl aryl sulfonate is used in amounts ranging between about 0.1 to 5% by weight of the treating solution. When a polyether alcohol is used as the wetting agent, it may be present in the treating solution in amounts ranging from 0.05 to 20% by weight. Generally speaking, if less than about 0.05% wetting agent is used in the treating solution, it is difficult to obtain a substantially uniform coating of the polymeric material. Thus, in a high frequency field the treated polymeric material behaves in the same way as if it were treated with water alone. As we have indicated previously, water can be used by itself if a thin layer of treated material is to be heated. If more than 20% by weight of wetting agent is used, overheating and charring of the polymeric material sometimes results. Too high a concentration of wetting agent also has the effect of causing the high frequency equipment to short out.

The temperature to which the treated polymeric material is heated in a high frequency field ultimately depends upon the power absorbed per unit volume of material. In turn, as shown by the formula aforesaid, the power absorbed is dependent on the power loss factor of the material to be heated, the voltage applied and the frequency of the wave generated by particular equipment. (The amount of treating solution and concentration of wetting agent therein control to a marked extent the power loss factor of the treated, expandable material.) A frequency of about 5 to 100 megacycles per second is suitable for purposes of the present invention.

We have already noted that the spacing of the electrodes of the high frequency equipment affects the temperature and the rate of heating. This effect can be offset by varying the frequency or the voltage.

If the expandable polymeric material is placed in molds or is interposed between facing materials in a manner hereafter described, the temperature and rate of heating of the expandable material in the high frequency field will depend to some extent upon the thickness and power loss factor of the mold and/or facing material.

In preparing expandable polymeric materials containing about 3 to 30% by weight of an aliphatic hydrocarbon boiling in the range of from 35 to 60° C. for treatment with high frequency waves, a measured portion of treating solution or treating paste containing an appropriate amount of wetting or coating agent is blended with the prescribed amount of polymer in any suitable manner. After the blending step the polymeric material, coated with a high power loss factor material, is placed in a field of high frequency waves to cause the dielectric heating. The polymeric material is removed from the field after expansion is accomplished (viz. when at least the softening point of the polymeric material is reached) and before the temperature is increased to a range wherein the foam begins to char.

Molds of various shapes can be used to contain the expandable polymeric material as it is being heated in the high frequency field. Thus, shaped articles including children's toys, cups, dishes and the like are produced in a quick and efficient manner. The mold used should be made of a low loss factor material to avoid dissipation of the high frequency energy therein. For example, such materials as wood, glass, quartz, ceramics, polymethacrylates, Teflon, polyester-impregnated glass fibers, silicone-impregnated glass fibers and the like are quite suitable.

Continuous boards or sheets of polymeric foam produced in this apparatus have self-sealing surfaces, thus obviating the use of facing materials in certain applications. The boards are conveniently produced between endless belts having supporting side walls to contain the polymeric material and exert pressure during transverse expansion.

In an embodiment of this invention pre-expanded polymeric particles, capable of further expansion, may be conveniently used. The pre-expanded polymeric material is prepared by controlled partial expansion of expandable beads of the type described in D'Alelio, supra, using hot water, infrared heat, hot air or steam. The free-flowing, pre-expanded particles have extremely low bulk density. They may be expanded by the method of the present invention into products of the desired shape having substantially the same low bulk density. Using the pre-expanded particles the density of the resulting polymeric foam can be more carefully controlled. Furthermore, their use is especially advantageous in preparing the sandwich-type materials hereafter described. Expandable particles are coated with a high loss factor material in the manner hereinbefore described. The individual particles are evenly spread over the surface of a moving belt which is passed through a high frequency field. The particles are allowed to remain in the high frequency field until they become partially foamed up; viz. until some, but not all of the expanding agent is removed therefrom. They are thereafter removed from the field and allowed to cool. Generally speaking, a heating time of 5 to 40 seconds is sufficient to accomplish the partial expansion.

To produce the sandwich-type panel structures of the present invention, the expandable polymeric materials treated or coated with a high loss factor material in the manner described aforesaid are disposed evenly between facing materials of the desired construction material. The facing materials include both flexible and rigid sheets. Flexible sheets suitable for the preparation of the various panel structures of the invention include such materials as kraft paper, polymeric sheets, e.g. cellophane, polyethylene, high impact polystyrene, and the like and various metallic foils, e.g. aluminum foil. Similarly, various flexible materials presently used as components of container structures can be used herein. Examples of these materials include jute paperboard, chip paperboard, manila paperboard, straw paperboard and the like. Rigid sheets include plywood, light gauge aluminum, light gauge steel, hardwood board, vegetable fiberboards, cement-asbestos boards, gypsum boards, phenolic-type resin-impregnated laminates and the like.

The facing materials having the expandable polymeric material interposed therebetween are passed through a field of high frequency waves generated in a manner hereinafter described, thereby causing a dielectric heating of the high power loss factor covering expandable polymeric particles. There is a concomitant expansion of the particles into an integral cellular structure which becomes affixed to the facing material. The facing material containing the cellular structure is thereafter cooled to cause the plastic to become rigid, thereby forming the desired sandwich-type material. Cooling may be accomplished by natural or artificial means.

In a further embodiment this invention is concerned with a modification of the technique described hereabove in which the opposed surfaces of the facing material are coated with an adhesive to provide adherence between the cellular polymeric structure and the facing material. Various adhesives can be used herein. For example, with kraft paper a conventional starch adhesive or, optionally, one modified with a urea-formaldehyde or resorcinol-formaldehyde resin to enhance water resistance works quite well. Alternatively, such adhesives as sodium silicate, polyvinyl alcohol, asphalt (molten or in an emulsion), resorcinol-formaldehyde resins, phenol-modified resorcinol-formaldehyde resins, polystyrene latices, and the like can be used. Generally speaking, elastomeric-type adhesives are quite suitable.

FIGURE 1 is a general schematic drawing of an embodiment of the novel apparatus.

FIGURE 2 is a sectional view taken along line II—II of FIGURE 1.

FIGURE 3 is an isometric view of the screw adjustor for raising and lowering the hot electrode.

Referring to FIGURE 1, the apparatus shown therein comprises a frame suitably supported (not shown for reasons of clarity) to which feed rolls 11 for supplying flexible facing material 12 are attached. The facing material passes over adhesive applicator rolls 13 and is held in position by guide rolls 15 for contact with expandable polymeric material 14. The expandable polymeric material is fed to the apparatus from a hopper (not shown), through feed means 16 (not shown in detail), such as a screw feeder. The feed means exert a pressure on the polymeric material during expansion. Polymeric material disposed between the flexible sheets 12 is passed between electrically insulated roller beds 17. The roller beds are enclosed by electrically insulated housing 18, which contains a high frequency generating unit (not shown), of a conventional type. The unit may be of the type known as a "Thermal" Electronic Heat Generator, manufactured by W. T. LaRose and Associates, Inc. of Troy, New York. It generally comprises three sections: (1) a power supply section, (2) a high frequency generating section, and (3) a control section. The power supply section receives alternating current of low voltage from a source (not shown), and it rectifies and transforms this current to high voltage current. The high frequency generating section receives the high voltage current and generates high frequency power. The control section regulates the operation of the other two sections. The high frequency field is generated between the hot electrode 19 and the ground electrode 21. The spacing between the electrodes is regulated by an electrically insulated screw adjustor 22 (compare FIGURE 3) attached to electrode 19 which can be moved up and down in a vertical direction. The electrically insulated roller beds 17 contain idling rolls 23 attached to supporting members (not shown). The supporting members are movable so that the thickness of the polymeric material passing through the high frequency field can be regulated. The central idling rolls 24 (those within the high frequency field) are fastened to electrodes 19 and 21 in a manner which will be described in detail with reference to FIGURE 2. The electrically insulated roller beds 17 are driven by driving rolls 25. Continuous belts 26 travel over driving rolls 25, idling rolls 23 and central idling rolls 24. A housing 27 is provided for a cooling zone 28 which contains restraining roller beds 29. The finished foam-core sandwich 31 is discharged from the cooling zone.

FIGURE 2 shows a central idling roll 24 movably mounted through Teflon bushings 32 to glass supports 33. The glass supports are fastened by bolts 34 to angular members 35. The angular members are mounted on ground electrode 21 by means of bolts 36. The central idling rolls are mounted on hot electrode 19 in a like manner.

FIGURE 2 is one embodiment of an essential feature of the apparatus of the present invention. It is necessary to construct the apparatus in such a manner as to avoid any interference with the dielectric field. For this reason the conveyor rolls that are placed directly in the high frequency field must be made of and supported by electrically insulated material. Such material must either be capable of receiving current from the electrodes and in turn serving as an electrode, or not subject to appreciable dielectric heating. Light gauge steel, aluminum, and polymeric materials have a low loss factor such as polytetrafluoroethylene (Teflon) work quite well. Other materials such as those enumerated hereabove (other than wood) in connection with mold construction are suitable. The Teflon bushing and the glass support tend to prevent any interference with the dielectric field. The glass support can be fastened to the electrode by means of a metal angular member provided, however, that the angular member is extended away from the electrode in a plane parallel therewith for a distance sufficient to avoid the high frequency field.

The apparatus is readily adaptable to making panels with rigid facing materials. The rigid facing materials can be supplied to the apparatus continuously, or they can be precut and placed in a mold assembly with the expandable polymeric material between them. The entire mold assembly can be conveyed through the high frequency field.

The apparatus can be modified to make boards of foamed structure without facing materials in both a continuous and a piecemeal manner. In one modification it can be used to make partially expanded polymeric material capable of further expansion.

The present invention is further illustrated by the following examples:

EXAMPLE I

A high frequency heating unit described as Model 34A–LH "Thermal Electronic Heat Generator" was obtained from W. T. LaRose and Associates, Inc. of Troy, New York and installed in the laboratory. The unit has a power output of 5 kw. and operates at a frequency of approximately 70 megacycles per second. The unit comprises essentially three sections, a power supply section, a high frequency generating section and a control section. Alternating current of 230 volts is fed to the power supply section wherein it is rectified and transformed to high voltage current. The high voltage current enters the high frequency generating section where an oscillator circuit together with a power tube generates the high frequency power. The control section consists essentially of start-stop circuits, a timer, overload relay switches and a safety interlock assembly.

Twenty-five grams of partially expanded expandable polystyrene beads were placed in a large beaker. The beads were carefully admixed with 7 cc. of an aqueous solution containing 0.3% of an alkyl aryl sulfonate sold commercially as Nacconol NRSF. The mixture of beads and solution were blended, thereby depositing a thin film of solution on each individual bead.

A red oak mold having a cavity approximately 5 inches square and 1½ inches deep was placed on a sheet of plywood ¼ inch thick. It was filled level with the blended mixture of expandable polystyrene and treating solution. The mold was covered with another piece of plywood, placed on an aluminum tray and inserted between the electrodes of the high frequency unit. The aluminum tray rested on strips of insulating material that held it at approximately ¼ inch above the ground electrode. A one-inch thick piece of high density expandably polystyrene (to serve as an air gap) was then placed on top of the mold assembly. The hot electrode was lowered until it exerted pressure on the high density polystyrene slab to provide a holding pressure on the mold assembly during formation of the polystyrene foam.

The unit was turned on and the expandable polystyrene was exposed to the high frequency field for five seconds. The foam, thus formed, was allowed to cool under the pressure exerted by the electrode for approximately three minutes. The mold assembly was removed from the unit, and foamed polystyrene was extracted from the mold.

The resulting product was a uniformly expanded low density foam having an even, compact surface.

Similar foams of polyethylene, polypropylene, and copolymers of styrene and alphamethyl styrene are made in the manner described hereabove.

EXAMPLE II

A series of experiments were made in the manner described in Example I to determine the concentration of wetting agent in the treating solution and the amount of treating solution to be applied to a fixed quantity of expandable polymeric material.

Nacconol NRSF, an anionic detergent, was used as the wetting agent in each of the experiments. Twenty five grams of partially expanded expandable polymeric beads having a density of 2 lbs. per cubic foot were used therewith. The data is summarized in Table I. The resulting product is described as excellent, good, fair or poor in respect of the uniformity of expansion and the evenness of the surface.

*Table I*

| Concentration of Wetting Agent in $H_2O$, Weight Percent | Volume of Treating Solution, cc. | Molding Time, Sec. | Product Description |
|---|---|---|---|
| 5.0 | 3 | Shorted | |
| 5.0 | 2.8 | 4-5 | Excellent. |
| 2.0 | 5 | Shorted | |
| 2.0 | 4 | do | Do. |
| 2.0 | 3.5 | 5 | Do. |
| 2.0 | 3 | 5-6 | Do. |
| 2.0 | 2.5 | 6 | Do. |
| 1.0 | 10 | Shorted | |
| 1.0 | 5 | do | |
| 1.0 | 4.6 | do | |
| 1.0 | 4.2 | 5 | Good. |
| 1.0 | 3.8 | 5 | Poor. |
| 0.3 | 7 | 5 | Excellent. |
| 0.3 | 6 | 6 | Do. |
| 0.3 | 5.5 | 6 | Do. |
| 0.3 | 5 | 6 | Do. |
| 0.3 | 4 | 6 | Poor. |
| 0.3 | 4 | 8 | Good. |
| 0.3 | 3 | 8 | Poor. |
| 0.2 | 10 | 6-7 | Excellent. |
| 0.2 | 6 | 6-7 | Fair. |
| 0.1 | 10 | 8 | Excellent. |
| 0.1 | 6 | 6 | None. |

From the data given in Table I it can be concluded that the weight percent concentration of Nacconol NRSF can be varied between 0.1% and 5% with excellent results. It is understood that the above data is only exact using the fixed conditions of voltage, frequency, electrode spacing and the like described in Example I. The relationship of the concentration of the wetting agent to the heat generated per unit volume of expandable polymeric material has been previously discussed in the specification.

EXAMPLE III

A series of experiments were conducted following the procedure outlined in Examples I and II using as a wetting agent the non-ionic alkyl aryl polyether alcohol sold commercially at Triton X-100. Twenty five grams of partially expanded expandable polymeric beads having a density of 2 lbs. per cubic foot were used therewith. The data is shown hereunder in Table II.

*Table II*

| Concentration of Wetting Agent in $H_2O$, Weight Percent | Volume of Treating Solution, cc. | Molding Time, Sec. | Product Description |
|---|---|---|---|
| 20 | 10 | 10-11 | Good. |
| 10 | 10 | 10-11 | Do. |
| 10 | 10 | 10-11 | Do. |
| 0.2 | 10 | 10 | Excellent. |
| 0.2 | 5 | 10 | Poor. |
| 0.1 | 10 | 10 | Excellent. |
| 0.1 | 5 | 10 | None. |
| 0.05 | 10 | 10 | Excellent. |
| 0.05 | 8.4 | 10 | Do. |
| 0.05 | 7 | 10 | Do. |
| 0.05 | 6 | 10 | Poor. |
| 0.025 | 10 | 30 | Excellent. |
| 0.02 | 10 | 32 | Do. |
| 0.02 | 10 | 34 | Do. |

From the above data it can be concluded that the concentration of the poly-ether alcohol in the treating solution can be varied between 0.05 to 20% by weight using a 10 second heating time, under the conditions employed.

EXAMPLE IV

Using the procedure described in the foregoing examples a series of tests were made using a cationic wetting agent, cetyl trimethyl ammonium bromide. Twenty five grams of partially expanded expandable polymeric beads having a density of 2 lbs. per cubic foot were used therewith. The data is summarized in Table III.

*Table III*

| Concentration of Wetting Agent in $H_2O$, Weight Percent | Volume of Treating Solution, cc. | Molding Time, Sec. | Product Description |
|---|---|---|---|
| 2 | 6 | Shorted | |
| 2 | 5 | 5 | Excellent. |
| 2 | 4 | 5 | Do. |
| 2 | 3.8 | 5 | Do. |
| 2 | 3.0 | 5 | Do. |
| 0.3 | 6 | 6 | Do. |
| 0.3 | 4 | 6 | None. |
| 0.3 | 4.2 | 8 | Excellent. |
| 0.3 | 4 | 8 | Do. |
| 0.3 | 3 | 8 | None. |
| 0.2 | 6 | 6 | Poor. |
| 0.2 | 5 | 6 | Do. |

EXAMPLE V

Using the procedure described in Example I, a series of experiments were conducted to compare water and other substances having a power loss factor less than that of water. Twenty five grams of partially expanded expandable polymeric beads having a density of 2 lbs. per cubic foot were used therewith. The results are summarized in Table IV.

*Table IV*

| Substance Tested | Volume of Treating Solution, cc. | Molding Time, Sec. | Product Description |
|---|---|---|---|
| Water | 20 (approx.) | 40 | Excellent. |
| Do | 25 | 52 | Good. |
| Do | 30 | Shorted out | No product. |
| Do | 35 | do | Do. |
| Do | 40 | do | Do. |
| Ethylene glycol | 10 | 60 | Do. |
| Mineral oil | 10 | 60 | Do. |
| Ethanol | 10 | 60 | Do. |
| Isopropanol | 10 | 60 | Do. |

Of the substances tested it can be concluded that only water possesses a sufficiently high power loss factor to promote formation of the polymeric foam.

EXAMPLE VI

Following the general procedures described in Example I, twenty five grams of polystyrene beads were admixed with 15 cc. of a paste containing chlorowax (an aliphatic chlorinated hydrocarbon containing about 65% chlorine), water and antimony oxide in a 3:2:1 rate ratio. The treated beads were placed in the high frequency field and heated for 10 seconds. The resulting product was a low density flame-retardant foam.

EXAMPLE VII

Following the procedure described in Example I, experiments were made using twenty five grams of expandable polystyrene beads that had not been partially expanded. Nacconol NRSF was used as the wetting agent. The results, shown in Table V, are comparable to those of Example II, although it is indicated that a slightly higher concentration of wetting agent is required to use a heating time of 10 seconds or less.

*Table V*

| Concentration of Wetting Agent in H₂O, Weight percent | Volume of Treating Solution, cc. | Molding Time, Sec. | Product Description |
|---|---|---|---|
| 1.0 | 2 | 60 | Excellent. |
| 1.0 | 4 | 25 | Do. |
| 5.0 | 2 | Under 10 | Overheated. |

EXAMPLE VIII

The procedure of Example I, with the following modifications, was used to make partially expanded expandable polystyrene. Fifteen grams of expandable beads were treated with 5 cc. of 0.3% Nacconol NRSF and placed between the electrodes on a sheet of plywood, suitably supported. The particles began to partially foam up after 10 seconds. All of the beads were suitably preexpanded after 40 seconds.

The present invention provides a method of making continuous sheets of foamed polymeric material and continuous sandwich-type panels with fastener production rates, lower operating costs and lower investment per unit of capacity. The invention is readily adaptable to the molding of thin sections and panels with interior supports of unusual configuration. The foam core of the sandwich-type panels is of more uniform density.

We claim:

1. Apparatus for preparing sandwich-type panel structure wherein a low density cellular polymeric material having uniform small voids is interposed between and affixed to sheets of facing material comprising feed rolls for maintaining said sheets in spaced relationship in parallel planes, guide rolls for regulating the spacing between said planes, adhesive applicator rolls intermediate said feed rolls and said guide rolls, a feeder for disposing evenly between said sheets expandable polymeric particles having a low power loss factor covered with a material havin a high power loss factor to render each of said particles capable of being individually affected by a high frequency field to heat each of said particles, electrodes movably mounted in spaced relationship for providing a high frequency field, an upper and lower set of parallel electrically insulated idling rolls having ends extending beyond said field positioned in said field in planes parallel with said electrodes, glass supports located beyond said field suitably connected with said ends, angular supports extending beyond said field connecting said glass supports with said electrodes, electrically insulated idling rolls attached to movably mounted supports, positioned outside said field and on both sides of each set of idling rolls within said field in the same plane and parallel therewith, endless belts traveling over the upper and lower idling rolls and positioned contiguous to the outer faces of said sheets, driving rolls for advancing said sheets containing said particles through said field at a rate permitting heating of each of said particles to a temperature wherein softening and expansion occur, but below a temperature wherein charring occurs, and a chamber for receiving said sheets having expanded material sandwiched therebetween.

2. In an apparatus for conveying material through a high frequency field to be treated therewith the improvement comprising electrodes movably mounted in spaced relationship for providing a high frequency field, an upper and lower set of parallel electrically insulated idling rolls having ends extending beyond said field positioned in said field in planes parallel with said electrodes, glass supports located beyond said field slidably connected with said ends, angular supports extending beyond said field connecting said glass supports with said electrodes, electrically insulated idling rolls attached to movably mounted supports, positioned outside said field and on both sides of each set of idling rolls with said field in the same plane and parallel therewith, endless belts travelling over the upper and lower idling rolls and driving means associated with said belts.

References Cited in the file of this patent

UNITED STATES PATENTS

| | | |
|---|---|---|
| 2,423,902 | Peterson | July 15, 1947 |
| 2,436,732 | Rowe | Feb. 24, 1948 |
| 2,459,225 | Hickok | Jan. 18, 1949 |
| 2,463,288 | Leguillon | Mar. 1, 1949 |
| 2,482,062 | Hanson | Sept. 13, 1949 |
| 2,650,289 | Hagopian | Aug. 25, 1953 |
| 2,664,411 | Cooper | Dec. 29, 1953 |
| 2,669,521 | Bierly | Feb. 16, 1954 |
| 2,695,427 | Sarge et al. | Nov. 30, 1954 |
| 2,697,773 | Gordon | Dec. 21, 1954 |
| 2,744,291 | Stastny et al. | May 8, 1956 |
| 2,770,406 | Lane | Nov. 13, 1956 |
| 2,787,809 | Stastny | Apr. 9, 1957 |
| 2,841,205 | Bird | July 1, 1958 |
| 2,872,965 | Sisson | Feb. 10, 1959 |
| 2,894,918 | Killoran | July 14, 1959 |